United States Patent Office 3,200,146
Patented Aug. 10, 1965

3,200,146
TETRAHALOETHYLSULFENYL HALIDE
Edward D. Weil, Lewiston, Emil J. Geering, Grand Island, and Keith J. Smith, Lockport, N.Y., assignors to Hooker Chemical Corporation, Niagara Falls, N.Y., a corporation of New York
No Drawing. Filed Oct. 29, 1962, Ser. No. 233,874
4 Claims. (Cl. 260—543)

This is a continuation-in-part of application S.N. 800,981, filed March 23, 1959, now abandoned.

This invention relates to new compositions of matter and to methods of preparing and using these materials. More specifically, this invention resides in new compositions of matter which are designated as tetrahaloethylsulfenyl halides.

Compounds are generally described by the formula $C_2HX_4SX$ where X is a halogen, preferably chlorine or bromine, the halogens being the same or different. Preferred embodiments are 1,2,2,2-tetrachloroethylsulfenyl chloride, and 1,1,2,2-tetrachloroethylsulfenyl chloride. Examples of other compounds embraced within the scope of this invention are: 1-bromo-2,2,2-trichloroethylsulfenyl chloride, from bis(bromo-2,2,2-trichloroethyl) disulfide; 1,2-dibromo-2,2-dichloroethylsulfenyl chloride, from bis(1,2-dibromo-2,2-dichloroethyl) disulfide; 1,2,2,2-tetrabromoethylsulfenyl chloride, from bis(1,2,2,2-tetrabromoethyl) disulfide; 1,1,2,2-tetrabromoethylsulfenyl chloride, from bis(1,1,2,2-tetrabromoethyl) disulfide; and tetrachloroethylsulfenyl bromide, from tetrachloroethylsulfenyl chloride and hydrogen bromide.

The compositions of this invention can be prepared by the halogenation of bis(tetrahaloethyl) disulfides, the synthesis of which is described in a copending application. The preferred embodiments are prepared by the chlorinolysis of bis(tetrachloroethyl) disulfide, described in a copending application.

The products of this invention have utility as chemical intermediates, and as biological toxicants in particular as nematocides. Other uses will become apparent to those skilled in the art upon a reading of this disclosure.

One object of this invention is to provide a compound which has desirable nematocidal properties.

A further object of this invention is to provide a reactive compound having utility as a chemical intermediate.

Other objects will become apparent upon a further reading of the following disclosure.

The following example illustrates a method of preparing the preferred embodiment of this invention.

Example 1

Three hundred ninety-eight parts by weight of bis(tetrachloroethyl) disulfide (prepared by the reaction of trichloroethylene with sulfur monochloride as described in copending application S.N. 800,933, filed March 23, 1959 now Patent No. 3,088,818), is cooled to minus 20 degrees centigrade and treated with gaseous chlorine with agitation and cooling to maintain this temperature. After the weight has increased to 469 parts, the mixture is allowed to slowly rise to room temperature, then fractionated through a packed fractionating column at approximately three theoretical plates. The product taken off as a fraction boiling at 53 to 57 degrees centigrade (0.5 millimeter), is a malodorous yellow liquid having a specific gravity of 1.760 at 23 degrees centigrade, having the proper analysis for a tetrachloroethylsulfenyl chloride.

*Analysis.*—Calculated for $C_2HCl_5S$: Cl, 75.7%; S, 13.6%. Found: Cl, 76.2%; S, 13.5%.

By gas chromatography over a 250 cm. column packed with silicone grease on 30–60 mesh inert silicaceous support and maintained at 120 degrees centigrade the product was resolved into two isomers. The one isomer having the shorter retention time comprised 83 percent of the mixture. It was identified as the 1,2,2,2-tetrachloroethanesulfenyl chloride by the fact that its nuclear magnetic resonance spectrum measured at 60 megacycles on a Varian A60 NMR spectrograph, showed a portion resonance at 344 cycles per second, (relative to tetramethylsilane as standard) indicating less shielding of the proton compared to that in the other isomer. The other isomer, having the longer retention time, comprised 17 percent of the mixture. It was identified as the 1,1,2,2-tetrachloroethanesulfenyl chloride by the nuclear magnetic resonance spectrum which showed a proton resonance at 370 cycles per second (relative to tetramethylsilane as standard) indicating greater shielding of the proton (as would be caused by a greater number of adjacent chlorine atoms), relative to the other isomer.

The bis(tetrachloroethyl) disulfide starting material was therefore a mixture of bis(1,2,2,2-tetrachloroethyl) disulfide, bis(1,1,2,2-tetrachloroethyl) disulfide and $CHCl_2$—$CCl_2$—S—S—CHCl—$CCl_3$.

The process as described above may be modified by the use of higher or lower temperatures, preferably −40 to +40 degrees centigrade, subatmospheric or superatmospheric pressure, and may be run without a catalyst as in the example or with a catalyst such as ferric chloride. Surprisingly, although it has been known that chloroinolysis of other alkyl disulfides is beset by troublesome side reactions such as overchlorination, no such difficulty is experienced in the present case, and good yields are obtained even if an excess of chlorine over the theoretical is employed.

The novel compositions of this invention may also be produced by other means of chlorination known to those skilled in this art, such as by use of phosphorus pentachloride, photochemical chlorination, sulfur dichloride, sulfuryl chloride, and chlorides of iodine.

The compounds of this invention possess unexpected activity as nematocides as shown by the following example.

Example 2

Soil heavily infested with *Meloidogyne incognita* var. *acrita,* a nematode commonly responsible for root knot disease of vegetable crops and tobacco, was admixed with tetrachloroethylsulfenyl chloride at the rate of 0.5 gram per gallon of soil. After three days of aeration, cucumber seedlings were transplanted into the fumigated soil. The plants were then dug up after approximately two weeks and the roots examined. The plants were healthy and only a negligible number of root knots were observed, whereas similar untreated plants grown as controls in the same infested soil without fumigation had heavily knotted roots and were in a moribund condition as a result of nematode attack.

The preferred compound of the invention is also of wide utility as a chemical intermediate and undergoes many reactions to yield new and valuable compositions. For example, tetrachloroethylsulfenyl chloride is susceptible to oxidation by reagents such as nitric acid to tetrachloroethylsulfinyl chloride and the corresponding sulfonyl chloride. Also, the chlorine attached to sulfur may be replaced with various nucleophilic groups such as cyanide, thiocyanate, alkoxides, phenoxides, mercaptides, amides, imides, sulfinates, sulfonamides, and the like. The reaction of tetrachloroethylsulfenyl chloride with a salt of phthalimide or with a salt of tetrahydrophthalimide was unexpectedly found to yield N-trichlorovinylmercaptoimides, which are new compositions having utility as fungicides. In this case, as with most of the nucleophilic reagents particularly when used in excess, dehydrochlorination occurs simultaneously or consecutively with the replacement of the chlorine bonded to sulfur. This result was not expected since 2-chloroethylsulfenyl chloride and 1-chloroethylsulfenyl chloride have been known not to behave in this way.

The reaction of tetrachloroethylsulfenyl chloride with an equimolar amount of triethyl phosphate yields ethyl chloride and O,O-diethyl S-tetrachloroethyl phosphite, the latter being an insecticide which affects 100 percent kill of *Musca domestica* at the one percent concentration level.

Tetrachloroethylsulfenyl chloride may be dehydrochlorinated by bases such as triethylamine, for example, to form trichlorovinylsulfenyl chloride, a useful intermediate and biological toxicant described in our copending application, S.N. 852,931, filed November 16, 1959. No analogous reaction of a sulfenyl chloride to form an unsaturated sulfenyl chloride has been hitherto known. This result is particularly surprising since unsaturated sulfenyl chlorides have not been hitherto known to exist. Since the sulfenyl chloride groups generally react with double bonds, it is unexpected that any unsaturated sulfenyl chloride would be capable of existing in the monomeric form.

In addition to the above-described specific reactions, the compounds of the invention undergo typical sulfenyl chloride reaction such as Friedel-Crafts reactions, addition to olefins and acetylenes; and reduction to the disulfide. The derivatives thus produced generally exhibit biological activity.

The examples in the foregoing specification illustrating the method of preparation and utility of the compositions of this invention have been given for purposes of illustration, not limitation. Many other modifications and ramifications will naturally suggest themselves to those skilled in the art based on the disclosure of our basic discovery. These are intended to be comprehended within the scope of our invention.

We claim:
1. A compound having the formula $C_2HX_4SX$ where X is a halogen selected from the group consisting of chlorine and bromine.
2. Tetrachloroethylsulfenyl chloride.
3. 1,2,2,2-tetrachloroethylsulfenyl chloride.
4. 1,1,2,2-tetrachloroethylsulfenyl chloride.

References Cited by the Examiner

UNITED STATES PATENTS

| 2,821,554 | 1/58 | Ospenson | 260—543 |
| 2,853,516 | 9/58 | Louthan | 260—543 |
| 3,019,258 | 1/60 | Hauptschein et al. | 260—543 |

OTHER REFERENCES

Fuson et al.: J. Org. Chem., vol. 11, 1946, pp. 499–503.

Kharasch et al.: Chem. Reviews, vol. 39, 1946, pp. 282–285.

Phillips et al.: J. Chem. Soc. (London), 1929, pp. 535–549.

Scheider: Chem. Ber., vol. 84, 1951, pp. 911–916.

LORRAINE A. WEINBERGER, *Primary Examiner.*
LEON ZITVER, *Examiner.*